United States Patent [19]

Yamada

[11] Patent Number: 5,767,803
[45] Date of Patent: Jun. 16, 1998

[54] RADAR APPARATUS FOR ACCURATELY DETECTING A PATH OF A TARGET VEHICLE WHICH IS IN A LANE OF A VEHICLE

[75] Inventor: Yukinori Yamada, Susono, Japan

[73] Assignee: Toyota Jidosha Kabushiki Kaisha, Toyota, Japan

[21] Appl. No.: 755,018

[22] Filed: Nov. 22, 1996

[30] Foreign Application Priority Data

Dec. 4, 1995 [JP] Japan ................... 7-315480

[51] Int. Cl.$^6$ ................................................ G01S 13/93
[52] U.S. Cl. ................................... 342/69; 342/70
[58] Field of Search .................... 342/69, 70, 71, 342/72; 340/928, 935

[56] References Cited

U.S. PATENT DOCUMENTS

| | | | |
|---|---|---|---|
| 3,864,678 | 2/1975 | Yamanaka et al. | 342/72 |
| 4,158,841 | 6/1979 | Wuchner et al. | 342/70 |
| 4,916,450 | 4/1990 | Davis | 342/71 |
| 5,266,955 | 11/1993 | Izumi et al. | 342/70 |
| 5,467,072 | 11/1995 | Michael | 340/436 |
| 5,585,798 | 12/1996 | Yoshioka et al. | 342/70 |
| 5,598,163 | 1/1997 | Cornic et al. | 342/72 |
| 5,612,699 | 3/1997 | Yamada | 342/70 |

FOREIGN PATENT DOCUMENTS 6-214015  8/1994  Japan .
7-242133  9/1995  Japan .

*Primary Examiner*—Michael J. Carone
*Assistant Examiner*—Christopher K. Montgomery
*Attorney, Agent, or Firm*—Cushman Darby & Cushman IP Group of Pillsbury Madison & Sutro LLP

[57] ABSTRACT

A radar apparatus includes a radar unit which radiates a radar beam to a target in a forward direction of a vehicle and receives a reflection beam from the target to detect a target vehicle based on the received reflection beam. A scanning control unit moves a beam radiation axis of the radar unit across the target from left to right or vice versa in response to a scanning angle signal. A lane discriminating unit, having an input coupled to the radar unit and an output coupled to the scanning control unit, detects whether a path of the target vehicle is in a lane of the vehicle based on the received reflection beam. The lane discriminating unit supplies a scanning angle signal to the scanning control unit for each of a plurality of scanning angles, so that the beam radiation axis is moved for each of the plurality of scanning angles, detects a relative distance, a relative speed and a reflection beam level based on the received reflection beam after the beam radiation axis is moved, and detects whether one of a plurality of lane discriminating conditions is met by the relative distances, the relative speeds and the reflection beam levels for all the plurality of scanning angles.

11 Claims, 7 Drawing Sheets

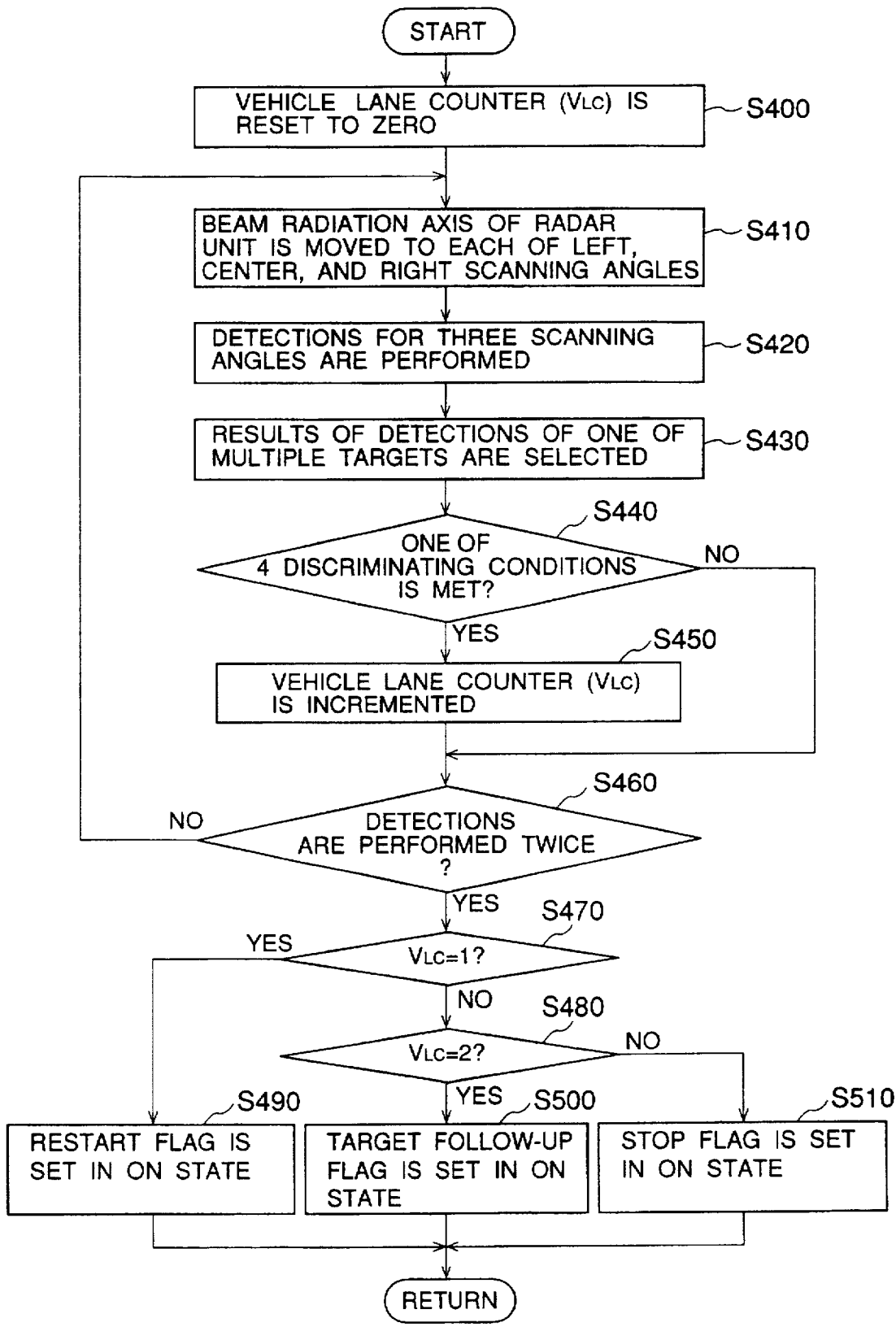

○:DETECTION ✕:NON-DETECTION

| SCANNING ANGLE<br>CONDITIONS | $\theta_i - \theta_r$<br>(LEFT) | $\theta_i$<br>(CENTER) | $\theta_i + \theta_r$<br>(RIGHT) |
|---|---|---|---|
| 1ST | ✕ | ○ | ✕ |
| 2ND | ○<br>LEFT BEAM | ○<br>< CENTER BEAM | ✕ |
| 3RD | ✕ | ○<br>CENTER BEAM | ○<br>> RIGHT BEAM |
| 4TH | ○<br>LEFT BEAM < | ○<br>CENTER BEAM AND<br>RIGHT BEAM < CENTER BEAM | ○ |

RADAR APPARATUS FOR ACCURATELY DETECTING A PATH OF A TARGET VEHICLE WHICH IS IN A LANE OF A VEHICLE

BACKGROUND OF THE INVENTION (1) Field of the Invention

The present invention generally relates to a radar apparatus of a vehicle, and more particularly to a radar apparatus which is installed on a vehicle to detect a target in a forward direction of the vehicle.

(2) Description of the Related Art

In recent years, various radar devices for use in automotive vehicles have been developed in order to provide increased safety and improved operability of the automotive vehicles. The radar devices are capable of detecting a relative distance between a target (such as a target vehicle) and the vehicle, and a relative speed of the target to a vehicle speed of the vehicle based on reflection beams received by a radar unit.

Two major types of the above radar devices are: one utilizing a radar unit which radiates a laser beam for detection of a reflection beam from a target, and the other utilizing a radar unit which radiates an electromagnetic wave for detection of a reflection beam from a target.

FIG. 1 shows an antenna pattern for explaining a relationship between the radar beam and a threshold value for detection of the reflection beam in a conventional radar apparatus. FIGS. 2A and 2B show searching ranges of the radar beam in a conventional radar apparatus.

In general, it is desirable that a searching range of the radar beam is always set in a range of a width of the vehicle lane by making the searching range narrow for a long-distance area and the searching range wide for a short-distance area. As shown in FIG. 1, it is necessary that a main beam in the antenna pattern has a narrow scanning range and side robes in the antenna pattern have a high reflection beam level. The presence of a target in a forward direction of the vehicle can be detected when a reflection beam level is above a fixed threshold value.

When the reflection beam level from the target is relatively high, an equivalent threshold value in this case is set at a threshold value "thl" in FIG. 1. Therefore, the searching range of the radar beam in this case is set such that a beam width for the main beam is defined by a scanning range angle "Θl2" and beam widths for the two side robes are defined by a scanning range angle "Θl1", as shown in FIG. 2B. Therefore, the searching range of the radar beam is wider than the width of the lane of the vehicle so as to cover the right or left adjacent lane. At this time, it is likely for the conventional radar apparatus to erroneously detect the path of the target as being in the lane of the vehicle even though the target is actually running in a different lane adjacent to the lane of the vehicle.

Japanese Laid-Open Patent Application No. 6-214015, which is assigned to the assignee of the present invention, teaches a radar apparatus including a radar unit radiating an electromagnetic wave for detection of signals from a target. In the radar apparatus of the above publication, the presence of a target in a forward running direction of the vehicle is detected when the reflection beam level from the target is above a threshold value. In this apparatus, the threshold value for the detection of the signals from the target can be suitably varied according to the reflection beam level from the target, so that various types of vehicles can be detected based on the results of the detection. The reflection beam level is determined depending on which one of the various vehicle types the target is.

In the radar apparatus of the above publication, as shown in FIG. 1, an intermediate threshold value which is determined by taking into account various reflection beam levels for the various vehicle types is set as a threshold value "tho". Since the intermediate threshold value "tho" is maintained at a constant level regardless of the reflection beam level from the target, the searching range of the radar beam is set as shown in FIG. 2A. In this case, the searching range for the short-distance area is set such that beam widths for the two side robes are defined by a scanning range angle "Θo1" and a beam width for the main beam is defined by a scanning range angle "Θo2".

On the other hand, when the searching range of the radar beam is extended for the long-distance area, the receiving power of the reflection beam at the antenna of the radar apparatus is reduced. The intermediate threshold value which corresponds to an antenna pattern of the long-distance case is increased from "tho" to "ths" in FIG. 1. Therefore, the searching range for the long-distance area is set such that the beam width for the main beam is defined by a scanning range angle "Θs" and the beam widths for the two side robes are eliminated.

Consequently, when the radar apparatus of the above publication is used, the searching range of the radar beam for the short-distance and long-distance areas is set as shown in FIG. 2A. The searching range of the radar beam can be included in the range of the width of the vehicle lane.

However, the radar apparatus of the above publication is designed for the detection of a target in a forward direction of the vehicle when the vehicle is running in a straight path. When the vehicle is running in a curved path, it is difficult for the radar apparatus of the above publication to accurately detect whether a path of a target vehicle is in a lane of the vehicle.

If a beam radiation axis of the radar unit of the above radar apparatus is moved toward the inside of the curved path in order to track the target, it is impossible that the searching range of the radar beam be included in the range of the width of the vehicle lane. At this time, it is likely for the radar apparatus of the above publication to erroneously detect the path of the target as being in the lane of the vehicle even though the target is actually running in a different lane adjacent to the lane of the vehicle. This cannot be avoided even though the threshold value for the detection is suitably varied according to the reflection beam level from the target.

Therefore, when the radar apparatus of the above publication is used, it is difficult to accurately detect whether the path of the target is in the lane of the vehicle when the vehicle is running in a curved path.

SUMMARY OF THE INVENTION

An object of the present invention is to provide an improved radar apparatus in which the above-described problems are eliminated.

Another object of the present invention is to provide a radar apparatus which accurately detects whether a path of a target vehicle is in a lane of a vehicle or in a different lane even when the vehicle is running in a curved path.

The above-mentioned objects of the present invention are achieved by a radar apparatus which includes: a radar unit which radiates a radar beam to a target in a forward direction of a vehicle and receives a reflection beam from the target to detect a target vehicle based on the received reflection beam; a scanning control unit which moves a beam radiation axis of the radar unit across the target from left to right or vice versa in response to a scanning angle signal; and a lane discriminating unit, having an input coupled to the radar unit and an output coupled to the scanning control unit, which detects whether a path of the target vehicle is in a lane of the vehicle based on the received reflection beam, the lane discriminating unit including: a first unit for supplying a scanning angle signal to the scanning control unit for each of left, center and right scanning angles, so that the beam radiation axis is moved for each of the left, center and right scanning angles; a second unit for detecting a relative distance, a relative speed and a reflection beam level based on the received reflection beam after the beam radiation axis is moved for each of the left, center and right scanning angles; a third unit for detecting whether one of a plurality of lane discriminating conditions is met by the relative distances, the relative speeds and the reflection beam levels for all the left, center and right scanning angles.

In the radar apparatus of the present invention, since the beam radiation axis of the radar unit is moved to each of the center, right and left scanning angles prior to the lane discrimination, not only the target vehicle whose path is in the lane of the vehicle but also the target vehicle whose path is in a different lane adjacent to the lane of the vehicle can be accurately detected. Thus, it is possible for the radar apparatus of the present invention to accurately determine whether the path of the target vehicle is in the lane of the vehicle or in a different lane adjacent to the lane of the vehicle. If the position of the vehicle is detected to be too near the target vehicle, the radar apparatus provides a warning of the too-near position of the vehicle to a vehicle operator.

In the radar apparatus of the present invention, since the lane discrimination is performed based on the results of the detections for each of the center, right and left scanning angles, it is possible to provide a correct result of the lane discrimination for not only a single target whose path is in the lane of the vehicle but also a plurality of targets whose paths are in the lane of the vehicle or in the right and left adjacent lanes. In addition, when the plurality of targets in the forward running direction of the vehicle are recognized, it is possible to correctly determine whether the path of one of the plurality of targets is in the lane of the vehicle or in a different lane adjacent to the lane of the vehicle.

Further, the lane discrimination according to the present invention is performed only when a relative distance between the target and the vehicle is above an allowable minimum distance, and the performance of the lane discrimination is inhibited when the relative distance is below the allowable minimum distance. It is possible for the radar apparatus of the present invention to prevent the movement of the beam radiation axis and the detection for the three scanning angles in the lane discrimination from being unnecessarily performed when the searching range of the beam is not wider than the boundary of the lane of the vehicle.

BRIEF DESCRIPTION OF THE DRAWINGS

The above and other objects, features and advantages of the present invention will become more apparent from the following detailed description when read in conjunction with the accompanying drawings in which:

FIG. 6 is a flowchart for explaining a lane discrimination routine performed within the tracking control procedure in FIGS. 5A, 5B and 5C;

DETAILED DESCRIPTION OF THE PREFERRED EMBODIMENT

A description will now be given of the preferred embodiment of the present invention with reference to the accompanying drawings.

Figure 4:
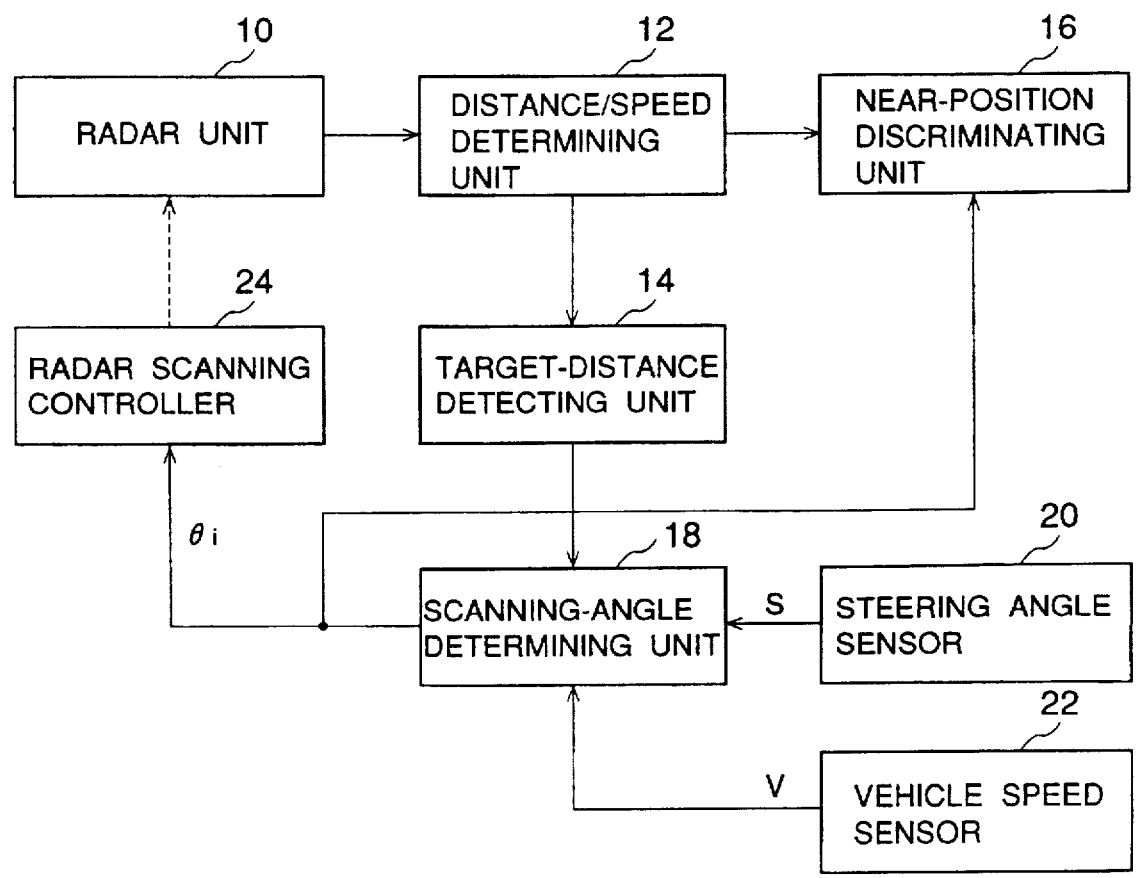
FIG. 4 is a system block diagram of a radar apparatus to which one embodiment of the present invention is applied.

FIG. 4 shows a radar apparatus to which one preferred embodiment of the present invention is applied. The radar apparatus is installed on an automotive vehicle to detect a target in a forward running direction of the vehicle.

Referring to FIG. 4, a radar unit 10 in the present embodiment is a frequency-modulation-continuous-wave radar unit which radiates an extremely-high-frequency electromagnetic wave as a radiation beam to a target in the forward running direction of the vehicle. A beam scanning of the radar unit 10 to a target is performed under the control of a radar scanning controller 24 by moving a beam radiation axis of the radar unit 10 across the target from the left to the right or vice versa on a horizontal plane including the forward running direction of the vehicle. The target in the forward running direction of the vehicle may be a fixed obstacle or a target vehicle.

The radar apparatus in the present embodiment includes an electronic control unit (ECU) which is provided within the vehicle but not shown in FIG. 4.

Reflection beam signals indicative of results of the detection of the target from the radar unit 10 are supplied to the ECU. These signals are processed within the radar apparatus based on the reflection beams received after the radiation beam has been reflected off the target. Based on the processed signals of the reflection beams from the radar unit 10, the ECU is capable of determining a relative distance between the target and the vehicle and a relative speed of the target to the vehicle speed of the vehicle.

A steering angle sensor 20 generates a signal indicative of a steering angle "S" of the vehicle and supplies this signal to a scanning-angle determining unit 18.

In the present embodiment, the steering angle sensor 20 is provided in the radar apparatus to detect whether the vehicle is running in a straight path. However, a modification of the present embodiment may be made such that a yaw rate sensor is used instead of the steering angle sensor 20. The yaw rate sensor generates a signal indicative of a yaw rate "YAW" of the vehicle and supplies the signal to the ECU. This yaw rate signal may be used in order to detect whether the vehicle is running in a straight path.

A vehicle speed sensor 22 generates a signal indicative of a vehicle speed "V" of the vehicle and supplies this signal to the scanning-angle determining unit 18.

A distance/speed determining unit 12 determines a relative distance between a target and the vehicle and a relative speed of the target to the vehicle speed of the vehicle, based on the signals from the radar unit 10. Signals indicative of the relative distance and the relative speed from the distance/speed determining unit 12 are supplied to each of a target-distance detecting unit 14 and a near-position discriminating unit 16.

The target-distance detecting unit 14 detects the presence of the target vehicle in the forward running direction based on the relative distance and the relative speed from the distance/speed determining unit 12. The target-distance detecting unit 14 determines a relative distance between the target vehicle and the vehicle based on the signals from the distance/speed determining unit 12 and based on the current momentum of the vehicle. A signal indicative of the relative distance of the target vehicle from the target-distance detecting unit 14 is supplied to the scanning-angle determining unit 18.

The scanning-angle determining unit 18 generates a signal indicative of a scanning angle "Θi" of the radar unit 10 based on the signal from the target-distance detecting unit 14 and the signals from the sensors 20 and 22, and supplies the scanning angle signal to the radar scanning controller 24. The radar unit 10 is controlled by the radar scanning controller 24 so that a beam radiation axis of the radar unit 10 is moved to scan the target in accordance with the scanning angle signal supplied from the scanning-angle determining unit 16. Accordingly, the ECU controls a beam scanning of the radar unit 10 in accordance with the scanning angle signal through the radar scanning controller 24.

Also, the scanning angle signal from the scanning-angle determining unit 18 is supplied to the near-position discriminating unit 16. Based on the relative distance and the relative speed from the distance/speed determining unit 12, the near-position discriminating unit 16 determines whether a position of the vehicle is too near the target. The determination of the too-near position of the vehicle is performed when the relative distance of the target in the forward running direction of the vehicle is smaller than a reference distance or when the relative speed of the target vehicle is above a reference speed. When it is determined that the position of the vehicle is too near the target vehicle, the near-position discriminating unit 16 switches ON an alarm unit of the vehicle in order to provide a warning of the near-position of the vehicle to a vehicle operator.

The above units 12, 14, 16 and 18 are constructed by using the ECU included in the radar apparatus, and the functions of these units are accomplished when the ECU has performed various control procedures.

Figure 5A:
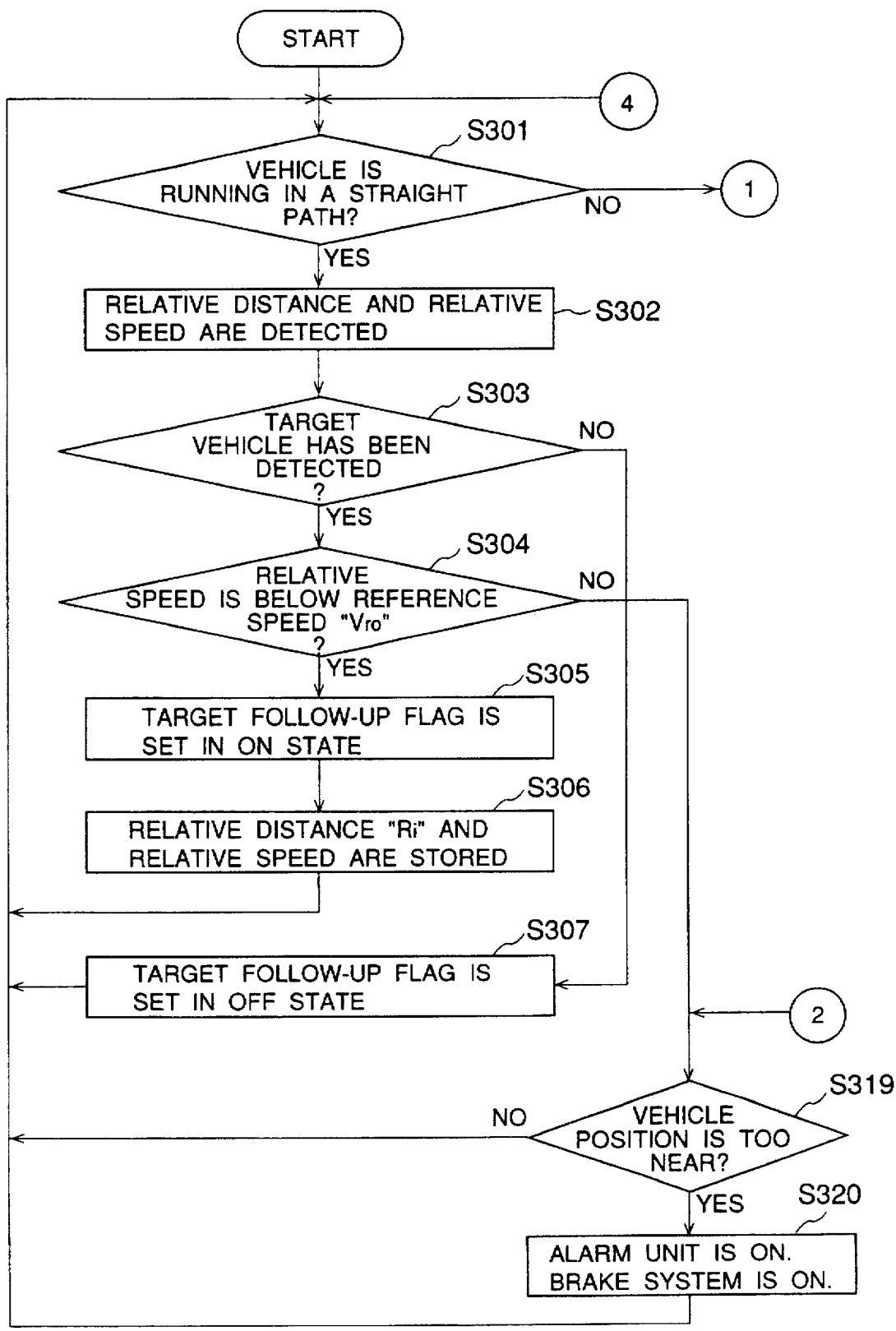
FIGS. 5A, 5B and 5C are a flowchart for explaining a tracking control procedure performed by the radar apparatus in FIG. 4.
Figure 5B:
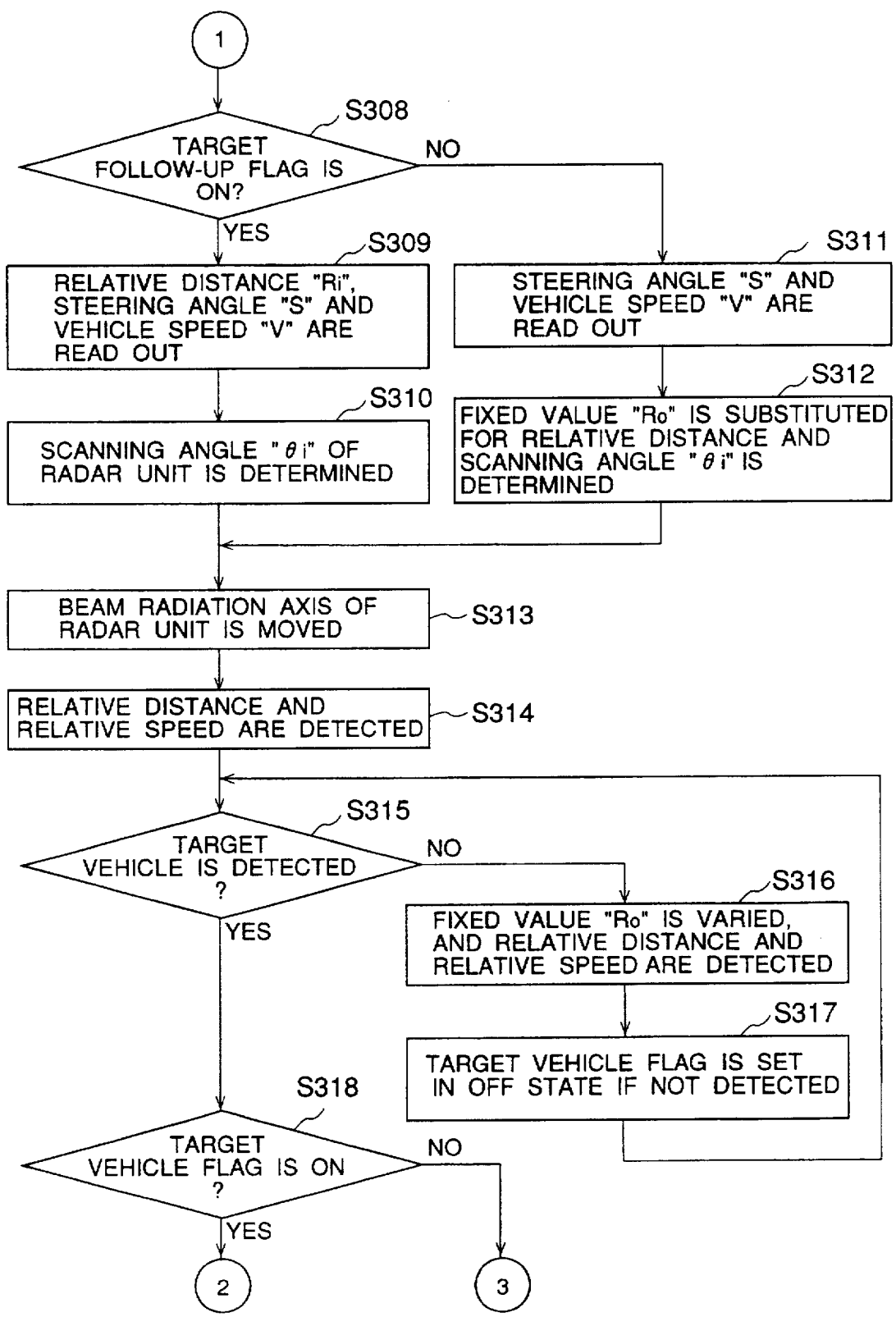
Figure 5C:
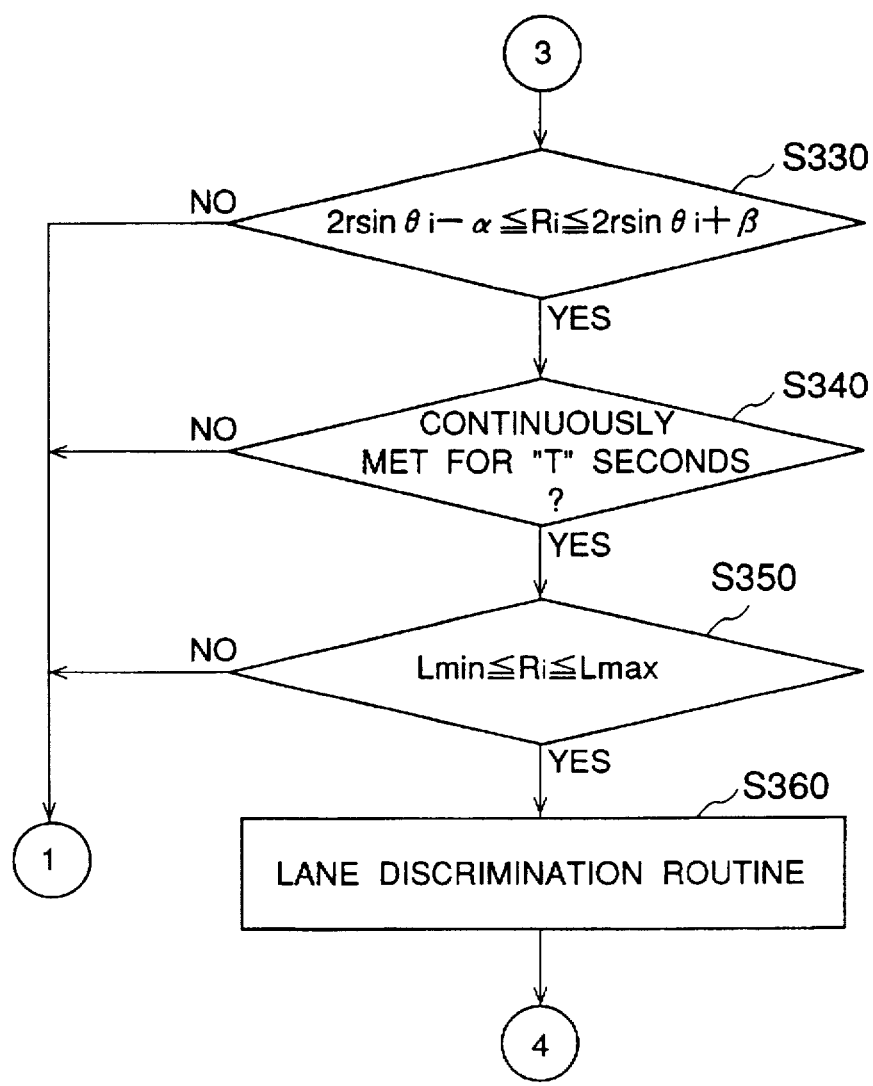

Next, FIGS. 5A, 5B and 5C show a tracking control procedure which is performed by the radar apparatus in FIG. 4. This tracking control procedure is one of the various control procedures which are performed by the ECU included in the radar apparatus.

Referring to FIG. 5A, when the tracking control procedure is started, the ECU at step S301 detects whether the vehicle is running in a straight path. This detection is performed based on the signal from the steering angle sensor 20.

If the steering angle "S" indicated by the signal from the steering angle sensor 20 is continuously greater than a reference steering angle "Sth" for a given time, the result at the step S301 is negative. That is, it is determined that the vehicle is presently running in a curved path. The control at this time is transferred to step S308 in FIG. 5B.

Otherwise the result at the step S301 is affirmative. That is, when the steering angle "S" is continuously greater than the reference steering angle "Sth" for the given time, it is determined that the vehicle is presently running in a straight path.

When the result at the step S301 is affirmative, step S302 is performed. Step S302 detects a relative distance between a target and the vehicle and a relative speed of the target to the vehicle speed based on the signals from the radar unit 10.

After the step S302 is performed, step S303 detects whether a target vehicle in the forward running direction of the vehicle has been detected. If a relative distance and a relative speed are determined by the distance/speed determining unit 12 based on the signals from the radar unit 10, it is determined that there is the target vehicle as the target which is presently running in the forward running direction of the vehicle. If a relative distance and a relative speed target are not determined by the distance/speed determining unit 12, it is determined that there is no target vehicle.

When the result at the step S303 is affirmative, step S304 is performed. Step S304 detects whether the relative speed of the target vehicle, which is detected at the step S302, is below a predetermined reference speed "Vro". The relative speed at this step means the difference between the speed of the vehicle and the speed of the target which is smaller than zero (or negative). The absolute value of the relative speed (the negative difference) is compared with the reference speed "Vro".

If the relative speed of the target vehicle is above the reference speed "Vro", it is necessary to detect whether the position of the vehicle is too near the target vehicle. The control at this time is transferred to step S319. That is, when the result at the step S304 is negative, step S319 detects whether the position of the vehicle is too near the target vehicle.

When the result at the step S319 is affirmative, step S320 is performed. Step S320 switches ON an alarm unit of the vehicle in order to provide a warning of the too-near position of the vehicle to a vehicle operator, and switches ON a brake system of the vehicle in order to decelerate the vehicle for safety. After the step S320 is performed, the control is transferred to the step S301.

When the result at the step S320 is negative, the control is transferred to the step S301 and the step S320 is not performed.

When the result at the step S304 is affirmative (the relative speed of the target vehicle is below the reference speed "Vro"), it is determined that the position of the vehicle is distant from the target vehicle. At this time, step S305 detects whether the condition in which the presence of the target vehicle is detected and the relative speed is below the reference speed "Vro", is continuously met for a predetermined time "To". If the condition at the step S305 is continuously met for the predetermined time "To", it is determined that the vehicle is presently approaching the target vehicle. The ECU at this time sets a target follow-up flag in ON state. Otherwise the ECU remains the target follow-up flag in OFF state.

After the step S305 is performed, step S306 stores the relative distance ("Ri") and the relative speed at the end of the predetermined time "To" in a memory of the ECU. At this time, the target follow-up flag is set in ON state and the relative distance and the relative speed are stored in the memory of the ECU. After the step S306 is performed, the control is transferred to the step S301.

When the result at the step S303 is negative (the presence of the target vehicle is not detected), step S307 is performed and the steps S304–S306 are not performed. Step S307 sets the target follow-up flag in OFF state. At this time, it is determined that the vehicle is not in a condition that it is approaching the target.

Accordingly, if the vehicle is running in a straight path and the target vehicle is detected, the radar apparatus sets the target follow-up flag in ON state when it is determined that the vehicle is presently approaching the target vehicle. The relative distance and the relative speed in such a case are stored. If the vehicle is running in a straight path but the target vehicle is not detected, the radar apparatus sets the target follow-up flag in OFF state.

When the vehicle is running in a curved path, it is necessary for the radar apparatus to perform a target tracking in order to correctly detect the relative distance and the relative speed between the vehicle and the target vehicle. Steps S308–S318 shown in FIG. 5B are performed for the purpose of the target tracking in the case of the target tracking.

Referring to FIG. 5B, when the result at the step S301 is negative, step S308 is performed. At this time, it is determined that the vehicle is presently running in a curved path. Step S308 detects whether the target follow-up flag is in ON state.

When the result at the step S308 is affirmative, step S309 reads out the relative distance "Ri", the steering angle "S" and the vehicle speed "V".

After the step S309 is performed, step S310 determines a radius "r" of curvature of the curved path and a scanning angle "Θi" of the radar unit 10 based on the read-out signals in accordance with the following equations:

$$\Theta i = \sin^{-1} (Ri/2r) \quad (1)$$

$$r = (1 + K1 \cdot V^2) \cdot K2/S \quad (2)$$

where V is the vehicle speed, S is the steering angle, and K1 and K2 are predetermined constants.

The scanning angle "Θi" in the above Equation (1) indicates the direction of the beam radiation axis of the radar unit 10 relative to the forward running direction of the vehicle during the vehicle is running in a curved path. Assuming that the beam radiation axis of the radar unit 10 is directed to the forward running direction of the vehicle, the scanning angle "Θi" is zero. The scanning angle "Θi" becomes a positive value (greater than zero) when the beam radiation axis of the radar unit 10 is moved to the left of the forward running direction of the vehicle, and becomes a negative value (smaller than zero) when the beam radiation axis of the radar unit 10 is moved to the right of the forward running direction of the vehicle.

As in the above-described modification, when a yaw rate sensor which generates the signal indicative of the yaw rate "YAW" of the vehicle is used instead of the steering angle sensor 20, the steering angle "S" in the above Equation (2) is represented by the following equation:

$$S = V/YAW \quad (3)$$

where V is the vehicle speed and YAW is the yaw rate of the vehicle.

After the step S310 is performed, step S313 supplies the scanning angle signal "Θi" to the radar scanning controller 24 and actuates the radar unit 10 so that the beam radiation axis of the radar unit 10 is moved to track the target in accordance with the scanning angle "Θi".

On the other hand, when the result at the step S308 is negative, the target follow-up flag is set in OFF state. At this time, a scanning angle "Θi" of the radar unit 10 is determined by setting the relative distance "Ri" between the target and the vehicle at a fixed value. Step S311 reads out the steering angle "S" and the vehicle speed "V". Step S312 substitutes a fixed value "Ro" for the relative distance "Ri" and determines the radius "r" of curvature of the curved path and the scanning angle "Θi" of the radar unit 10 based on the read-out signals in accordance with the above Equations (1) and (2). After the step S312 is performed, the control is transferred to the above step S313.

After the beam radiation axis of the radar unit 10 is moved to track the target in accordance with the scanning angle "Θi" at the step S313, step S314 detects a relative distance between a target and the vehicle and a relative speed of the target to the vehicle speed based on the signals from the radar unit 10.

After the step S314 is performed, step S315 detects whether a target vehicle as the target which is presently running in the forward running direction of the vehicle has been detected.

When the result at the step S315 is affirmative (the target vehicle is detected), step S318 is performed. Step S318 detects whether a target vehicle flag is set in ON state. As shown in FIG. 5B, when the result at the step S318 is affirmative, the control is transferred to the above-described step S319 in FIG. 5A. When the result at the step S318 is negative, the control is transferred to step S330 in FIG. 5C which will be described later.

On the other hand, when the result at the step S315 is negative (the target vehicle is not detected), step S316 is performed. Step S316 varies the fixed value "Ro" for the relative distance, and detects a relative distance between a target and the vehicle and a relative speed of the target to the vehicle speed based on the signals from the radar unit 10 after the fixed value "Ro" is varied. At the step S316, the fixed value "Ro" is repeatedly varied at intervals of a predetermined distance (for example, 2 m) up to a distance ranging from 40 m to 60 m.

Further, when the target vehicle is detected at the step S316 after the fixed value "Ro" is varied, the ECU at the step S316 sets the target vehicle flag in ON state. On the other hand, when the condition in which the target vehicle cannot be detected after the fixed value "Ro" is varied, is continuously met for the predetermined time "To", step S317 is performed. Step S317 sets the target vehicle flag in OFF state. At this time, it is determined that there is no target vehicle in the forward running direction of the vehicle. After the step S317 is performed, the control is transferred to the above step S315.

As described above, when the result at the step S318 is negative, the control is transferred to the step S330 in FIG. 5C. At this time, the target vehicle flag still remains in OFF state but the target vehicle as the target which is presently running in the forward running direction of the vehicle has been detected at the step S315. Thus, it is determined that the target vehicle is presently detected for the first time.

Referring to FIG. 5C, step S330 detects whether the relative distance "Ri" of the target vehicle meets the following requirements:

$$2 \cdot r \cdot \sin \Theta i - \alpha \leq Ri \leq 2 \cdot r \cdot \sin \Theta i + \beta \quad (4)$$

where α is a roadway lane allowance for an inner lane adjacent to a center lane in which the vehicle is presently running in the curved path, and β is a roadway lane allowance for an outer lane adjacent to the center lane of the vehicle.

When the above requirements (4) are met by the relative distance "Ri" of the target vehicle, it is determined that a lane of the target vehicle is the same as the lane of the vehicle.

When the result at the step S330 is affirmative, step S340 is performed. Step S340 detects whether the above requirements (4) are continuously met by the relative distance "Ri" of the target vehicle for a predetermined time (e.g., for "T" seconds).

When the result at the step S340 is affirmative, step S350 is performed. Step S350 detects whether the relative distance "Ri" of the target vehicle meets the following requirements:

$$Lmin \leq Ri \leq Lmax \qquad (5)$$

where Lmin is an allowable minimum distance for the lane discrimination, and Lmax is an allowable maximum distance for the lane discrimination. When the relative distance "Ri" is above the allowable minimum distance Lmin and below the allowable maximum distance Lmax, the searching range of the beam from the radar unit 10 is wider than a boundary of the lane of the vehicle so as to cover the right or left adjacent lane. At this time, it is likely for the conventional radar apparatus to erroneously detect the path of the target as being in the lane of the vehicle even though the target is actually running in a different lane adjacent to the lane of the vehicle. To avoid this, in the present embodiment, a lane discrimination routine is performed at step S360, which will be described later.

In the present embodiment, the allowable minimum distance Lmin is 50 m and the allowable maximum distance Lmax is 100 m.

As described above, when the result at the step S350 is affirmative, the step S360 (the lane discrimination routine) is performed. After the step S360 is performed, the control is transferred to the step S301 in FIG. 5A.

When none of the above requirements at the steps S330, S340 and S350 are met, the control is transferred to the step S301 in FIG. 5A and the step S360 (the lane discrimination routine) is not performed.

FIG. 6 shows a lane discrimination routine which is executed by the radar apparatus of the present embodiment at the step S360 in the tracking control procedure in FIG. 5C.

Referring to FIG. 6, when the lane discrimination routine is started, the ECU at step S400 resets a vehicle lane counter (VLC) to zero. The vehicle lane counter (VLC) is used in this routine in order to correctly detect whether the path of the target is the same as the lane of the vehicle.

After the step S400 is performed, step S410 moves the beam radiation axis of the radar unit 10 to track the target in accordance with each of left, center, and right scanning angles "Θi–Θl", "Θi", and "Θi+Θr". At this step, the ECU supplies each scanning angle signal to the radar scanning controller 24, and actuates the radar unit 10 through the radar scanning controller 24 so that the beam radiation axis of the radar unit 10 is moved in accordance with each scanning angle.

The three scanning angles mentioned above are as follows: the center scanning angle "Θi" is a scanning angle when the beam radiation axis of the radar unit 10 is directed to the center of the target, the left scanning angle "Θi–Θl" is a scanning angle when directed to the left of the target, and the right scanning angle "Θi+Θr" is a scanning angle when directed to the right of the target. A difference scanning angle "Θr" between the center scanning angle and the right scanning angle and a difference scanning angle "Θl" between the center scanning angle and the left scanning angle are determined by the following equations.

$$\Theta r = \Theta l = \tan^{-1}(W/Ri) \qquad (6)$$

where W is a predetermined lane width (which is, for example, 3.5 m), and Ri is the relative distance between the target and the vehicle.

Figures 7, 8:
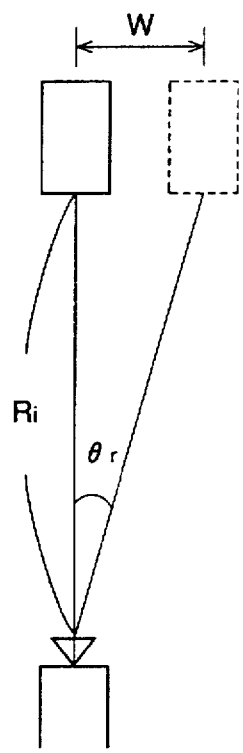
FIG. 7 is a diagram which is useful for explaining a difference scanning angle with respect to a forward running direction of a vehicle.
FIG. 8 is a diagram showing an example of lane discriminating conditions used by the radar apparatus in the lane discrimination routine in FIG. 6.

FIG. 7 shows the difference scanning angle "Θr" with respect to the forward running direction of the vehicle. As shown in FIG. 7, the difference scanning angle "Θr" (and the difference scanning angle "Θl") is a function of the relative distance "Ri" as the lane width "W" is predetermined.

After the step S410 is performed, step S420 is performed for each of the three scanning angles. Step S420 detects the relative distance, the relative speed, and the reflection beam level based on the signals from the radar unit 10 after the beam radiation axis of the radar unit 10 is moved to a corresponding scanning angle, for each of the left scanning angle "Θi–Θl", the center scanning angle "Θi", and the right scanning angle "Θi+Θr".

After the step S420 is performed, step S430 is performed when a plurality of targets are detected. Step S430 selects the results of the detections of one of the plurality of targets, the selected one of the targets being different from the previously-detected target which causes the lane discrimination routine to previously start. The results of the detections of the selected target include the relative distance, the relative speed and the reflection beam level, which are equivalent to those of the previously-detected target.

After the step S430 is performed, step S440 detects whether one of four lane discriminating conditions shown in FIG. 8 is met by the results of the detections for all the three scanning angles.

FIG. 8 shows an example of the lane discriminating conditions used by the radar apparatus when the step S440 in the lane discriminating routine is performed.

As shown in FIG. 8, the first lane discriminating condition is that a target for the center scanning angle "Θi" is detected and no target for each of the left scanning angle "Θi–Θl" and the right scanning angle "Θi+Θr" is detected. The second lane discriminating condition is that a target for the center scanning angle "Θi" is detected, a target for the left scanning angle "Θi–Θl" is detected but no target for the right scanning angle "Θi+Θr" is detected, and the center reflection beam level for the center scanning angle "Θi" is greater than the left reflection beam level for the left scanning angle "Θi–Θl". The third lane discriminating condition is that a target for the center scanning angle "Θi" is detected, no target for the left scanning angle "Θi–Θl" is detected, and a target for the right scanning angle "Θi+Θr" is detected, and further the center reflection beam level for the center scanning angle "Θi" is greater than the right reflection beam level for the right scanning angle "Θi–Θr". The fourth lane discriminating condition is that a target for the center scanning angle "Θi" is detected, a target for the left scanning angle "Θi–Θl" is detected, a target for the right scanning angle "Θi+Θr" is detected, and the center reflection beam level for the center scanning angle "Θi" is greater than the left reflection beam level for the left scanning angle "Θi–Θl" and greater than the right reflection beam level for the right scanning angle "Θi+Θr".

When the result at the step S440 is affirmative (one of the lane discriminating conditions is detected to be true), step S450 is performed. Step S450 increments the vehicle lane counter (VLC=VLC+1). After the step S450 is performed, step S460 is performed.

When the result at the step S440 is negative (none of the lane discriminating conditions are detected to be true), step S460 is performed and the step S450 is not performed.

Step S460 detects whether the detections of the relative distances, the relative speeds and the reflection beam levels for all the three scanning angles at the steps S410 and 420 are performed twice.

When the result at the step S460 is negative, the steps S410 and S420 are still performed once. At this time, the control is transferred to the step S410 so that the detections at the steps S410 and S420 for the three scanning angles are performed again.

When the result at the step S460 is affirmative, step S470 is performed. At this time, since the detections of the relative distances, the relative speeds and the reflection beam levels for the three scanning angles are performed twice, it is determined that a determination of the lane of the target vehicle based on the results of the detections can be made sufficiently accurate so as to avoid the erroneous detection.

Step S470 detects whether the vehicle lane counter (VLC) is equal to 1. When the result at the step S470 is negative, step S480 detects whether the vehicle lane counter (VLC) is equal to 2.

On the other hand, when the result at the step S470 is affirmative (VLC=1), it is uncertain whether the path of the target vehicle is actually the same as the lane of the vehicle. At this time, step S490 is performed. Step S490 sets a restart flag in ON state so as to restart the lane discrimination routine in FIG. 6 after a predetermined time (which is, for example, two seconds). After the step S490 is performed, the lane discrimination routine at the present cycle ends. The control will be transferred to the step S301 in FIG. 5A.

When the result at the step S480 is affirmative (VLC=2), it can be correctly determined that the path of the target vehicle is actually the same as the lane of the vehicle. At this time, step S500 is performed. Step S500 sets the target follow-up flag in ON state. After the step S500 is performed, the lane discrimination routine at the present cycle ends. The control will be transferred to the step S301 in FIG. 5A.

If the target follow-up flag is set in ON state at the step S500, the result at the above step S308 is affirmative, and the control will be transferred to the above step S319 after the steps S309–S318 are performed. That is, the step S319 detects whether the position of the vehicle is too near the target vehicle whose path is detected as being the same as the lane of the vehicle. As described above, when the result at the step S319 is affirmative, the step S320 switches ON the alarm unit in order to provide a warning of the too-near position of the vehicle to a vehicle operator, and switches ON the brake system in order to decelerate the vehicle for safety.

When the result at the step S480 is negative (VLC=0), it is determined that the path of the target vehicle is in a different lane adjacent to the lane of the vehicle. At this time, step S510 is performed. Step S510 sets a stop flag in ON state so as to stop the lane discrimination routine in FIG. 6 over a predetermined time (which is, for example, five seconds). After the step S510 is performed, the lane discrimination routine at the present cycle ends. The control will be transferred to the step S301 in FIG. 5A.

Figure 1:
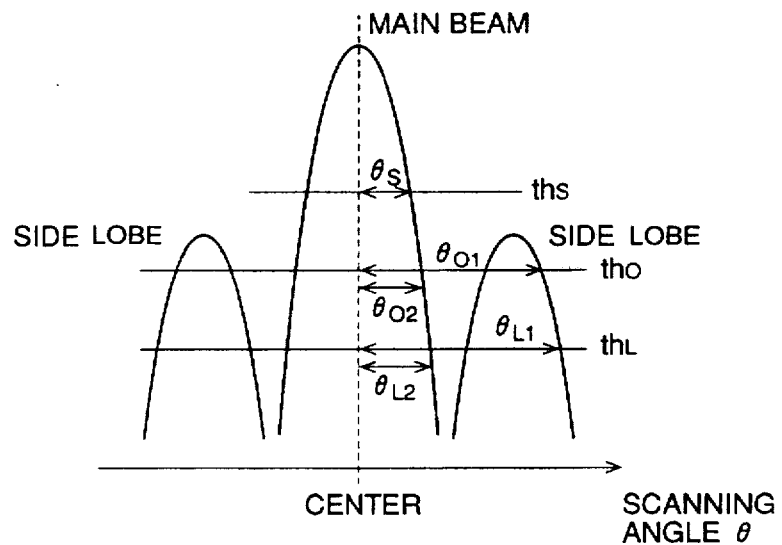
FIG. 1 is a diagram showing an antenna pattern which is useful for explaining a relationship between a radar beam and a threshold value for detection of a reflection beam in a conventional radar apparatus.
Figure 2A:
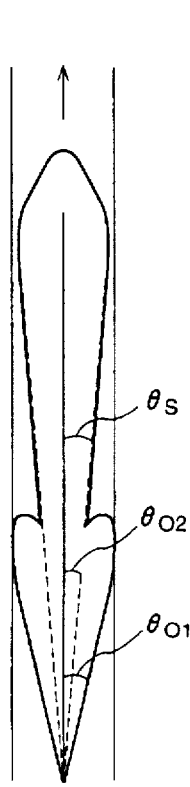
FIGS. 2A and 2B are diagrams showing searching ranges of the radar beam in the conventional radar apparatus.
Figure 2B:
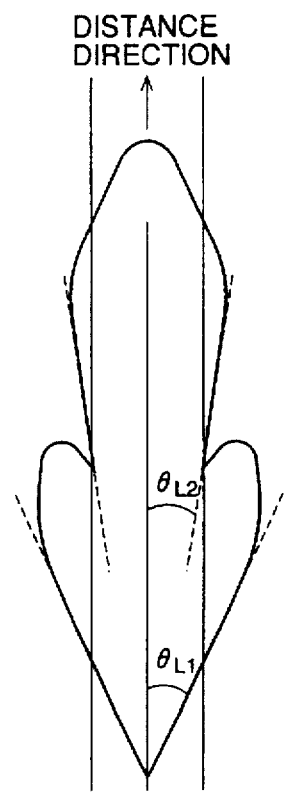
Figure 3:
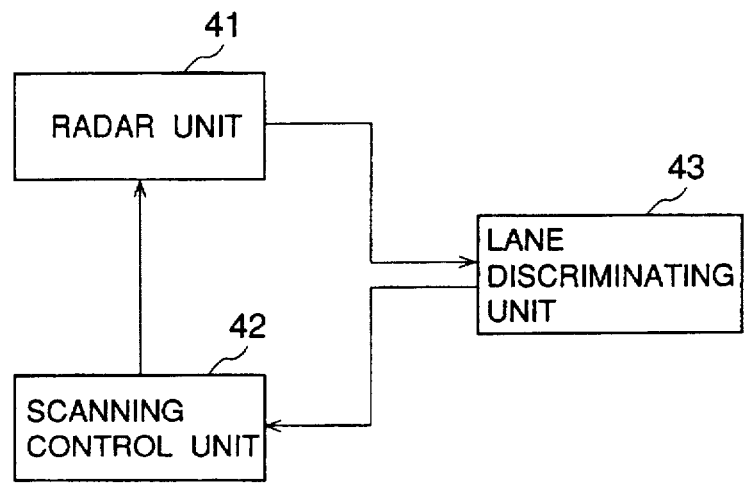
FIG. 3 is a block diagram which is useful for explaining a radar apparatus according to a basic concept of the present invention.

Next, FIG. 3 shows a radar apparatus according to a basic concept of the present invention. The basic concept of the present invention will be apparent from the foregoing description of the preferred embodiment.

Referring to FIG. 3, a radar unit 41 radiates a radar beam to a target in a forward direction of a vehicle and receives a reflection beam from the target to detect a target vehicle based on the received reflection beam. The radar unit 41 is constructed by the radar unit 10 and the distance/speed determining unit 12, both shown in FIG. 4, and the ECU of the radar apparatus.

A scanning control unit 42 moves a beam radiation axis of the radar unit 41 across the target from left to right or vice versa in response to a scanning angle signal. The scanning control unit 42 is constructed by the radar scanning controller 24 shown in FIG. 4.

A lane discriminating unit 43, having an input coupled to the radar unit 41 and an output coupled to the scanning control unit 42, detects whether a path of the target vehicle is in a lane of the vehicle based on the received reflection beam. The lane discriminating unit 43 supplies a scanning angle signal to the scanning control unit 42 for each of left, center and right scanning angles, so that the beam radiation axis of the radar unit 41 is moved for each of the left, center and right scanning angles. The lane discriminating unit 43 detects a relative distance, a relative speed and a reflection beam level based on the received reflection beam after the beam radiation axis of the radar unit 41 is moved for each of the left, center and right scanning angles. The lane discriminating unit 43 detects whether one of a plurality of lane discriminating conditions is met by the relative distances, the relative speeds and the reflection beam levels for all the left, center and right scanning angles. The lane discriminating unit 43 is constructed with the ECU of the radar apparatus by performing the lane discrimination routine shown in FIG. 6.

In the above-described embodiment, since the beam radiation axis of the radar unit is moved to each of the center, right and left scanning angles prior to the lane discrimination of a target, not only the target vehicle whose path is in the lane of the vehicle but also the target vehicle whose path is in a different lane adjacent to the lane of the vehicle can be accurately detected. Thus, it is possible for the radar apparatus of the present invention to accurately determine whether the path of the target vehicle is in the lane of the vehicle or in a different lane adjacent to the lane of the vehicle. If the position of the vehicle is detected to be too near the target vehicle, the radar apparatus provides a warning of the too-near position of the vehicle to a vehicle operator.

In addition, in the above-described embodiment, since the lane discrimination of the target is performed based on the results of the detections for each of the center, right and left scanning angles, the radar apparatus of the present embodiment can provide correct lane discrimination for not only a single target whose path is in the lane of the vehicle but also a plurality of targets whose paths are in the lane of the vehicle or in the right and left adjacent lanes. In addition, when the plurality of targets in the forward running direction of the vehicle are recognized, it is possible to correctly determine whether the path of one of the plurality of targets is in the lane of the vehicle or in the right or left adjacent lane.

Further, in the above-described embodiment, the lane discrimination according to the present invention is performed when the relative distance between the target and the vehicle is above the allowable minimum distance Lmin, and the performance of the lane discrimination is inhibited when the relative distance is below the allowable minimum distance. It is possible for the radar apparatus of the present embodiment to prevent the movement of the beam radiation axis and the detection for the three scanning angles in the lane discrimination from being unnecessarily performed when the searching range of the beam is not wider than the boundary of the lane of the vehicle.

In addition, in the above-described embodiment, the radar apparatus includes the radar unit which radiates an electromagnetic wave for the detection of a target in the forward running direction of the vehicle. However, a modification of the present embodiment may be made such that the radar apparatus includes a radar unit which radiates a light beam for the detection of the target, rather than the radar unit.

Further, the present invention is not limited to the above-described embodiment, and variations and modifications may be made without departing from the scope of the present invention.

What is claimed is:

1. A radar apparatus of a vehicle comprising:

radar means for radiating a radar beam to a target in a forward direction of the vehicle and for receiving a reflection beam from the target to detect a target vehicle based on the received reflection beam;

scanning control means for moving a beam radiation axis of the radar means across the target from left to right or vice versa in response to a scanning angle signal; and lane discriminating means, having an input coupled to said radar means and an output coupled to said scanning control means, for detecting whether a path of the target vehicle is in a lane of the vehicle based on the received reflection beam, said lane discriminating means including:

first means for supplying a scanning angle signal to said scanning control means for each of a plurality of scanning angles, so that the beam radiation axis is moved for each of the plurality of scanning angles;

second means for detecting a relative distance, a relative speed and a reflection beam level based on the received reflection beam after the beam radiation axis is moved for each of the plurality of scanning angles;

third means for detecting whether one of a plurality of lane discriminating conditions is met by the relative distances, the relative speeds and the reflection beam levels for all the plurality of scanning angles.

2. The radar apparatus according to claim 1, wherein said lane discriminating means detects the presence of a target vehicle as well as the reflection beam level based on the received reflection beam with respect to each of the plurality of scanning angles.

3. The radar apparatus according to claim 1, wherein said lane discriminating means performs the detection of the path of the target vehicle only when a relative distance between the target vehicle and the vehicle is above an allowable minimum distance.

4. The radar apparatus according to claim 1, further comprising:

means for determining a scanning angle from a relative distance, a steering angle, and a vehicle speed when the vehicle is detected to be running in a curved path.

5. The radar apparatus according to claim 1, further comprising:

means for detecting whether the relative speed of the target vehicle is below a reference speed when the path of the target vehicle is detected to be in the lane of the vehicle.

6. The radar apparatus according to claim 1, further comprising:

means for setting an alarm unit of the vehicle in ON state when the path of the target vehicle is detected to be in the lane of the vehicle and a position of the vehicle is detected to be too near the target vehicle.

7. The radar apparatus according to claim 1, further comprising:

means for determining a scanning angle from a relative distance, a yaw rate, and a vehicle speed when the vehicle is detected to be running in a curved path.

8. The radar apparatus according to claim 1, wherein said third means performs the determination on the one of the lane discriminating conditions at least twice prior to the detection of the path of the target vehicle.

9. The radar apparatus according to claim 1, wherein said second means performs the detection of the relative distances, the relative speeds and the reflection beam levels for all the plurality of scanning angles at least twice prior to the detection of the path of the target vehicle.

10. The radar apparatus according to claim 1, wherein said lane discriminating means performs the detection of the path of the target vehicle when the vehicle is detected to be running in a curved path.

11. The radar apparatus according to claim 1, wherein said lane discriminating means performs a comparison between the reflection beam levels for all the plurality of scanning angles when the detection of the path of the target vehicle is performed.

* * * * *